(No Model.)

G. CREWS.
HAY TEDDER.

No. 444,423. Patented Jan. 13, 1891.

Attest:
Geo. B. Smith
Charles J. Crews
T. W. B. Crews

Inventor:
Gideon Crews

THE NORRIS PETERS CO., PHOTO-LITHO., WASHINGTON, D. C.

UNITED STATES PATENT OFFICE.

GIDEON CREWS, OF PACIFIC, MISSOURI.

HAY-TEDDER.

SPECIFICATION forming part of Letters Patent No. 444,423, dated January 13, 1891.

Application filed December 7, 1889. Serial No. 332,991. (No model.)

*To all whom it may concern:*

Be it known that I, GIDEON CREWS, of the city of Pacific, in the county of Franklin and State of Missouri, have invented a new and useful Improvement in Hay-Tedding Machines, of which the following is a full, clear, and exact description.

My invention consists of an attachment to the hay-tedding machine, and in the novel construction and combination of its several parts with said machine and the effective improvement of the same, as will hereinafter be fully set forth, and pointed out in the claim.

Reference is to be had to the accompanying drawings, forming a part of this specification, in which similar letters and figures of reference indicate corresponding parts in all the views.

Figure 1:
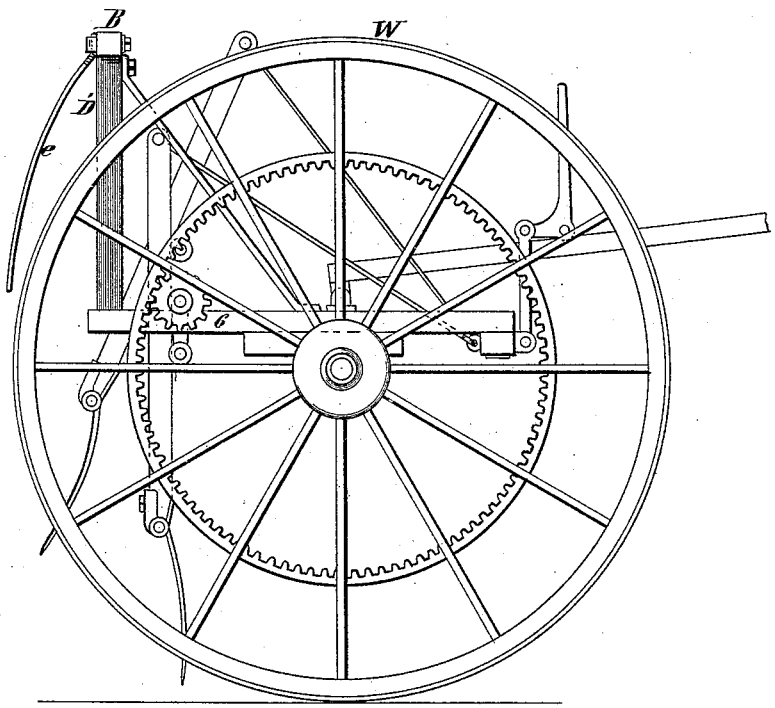
Figure 2:
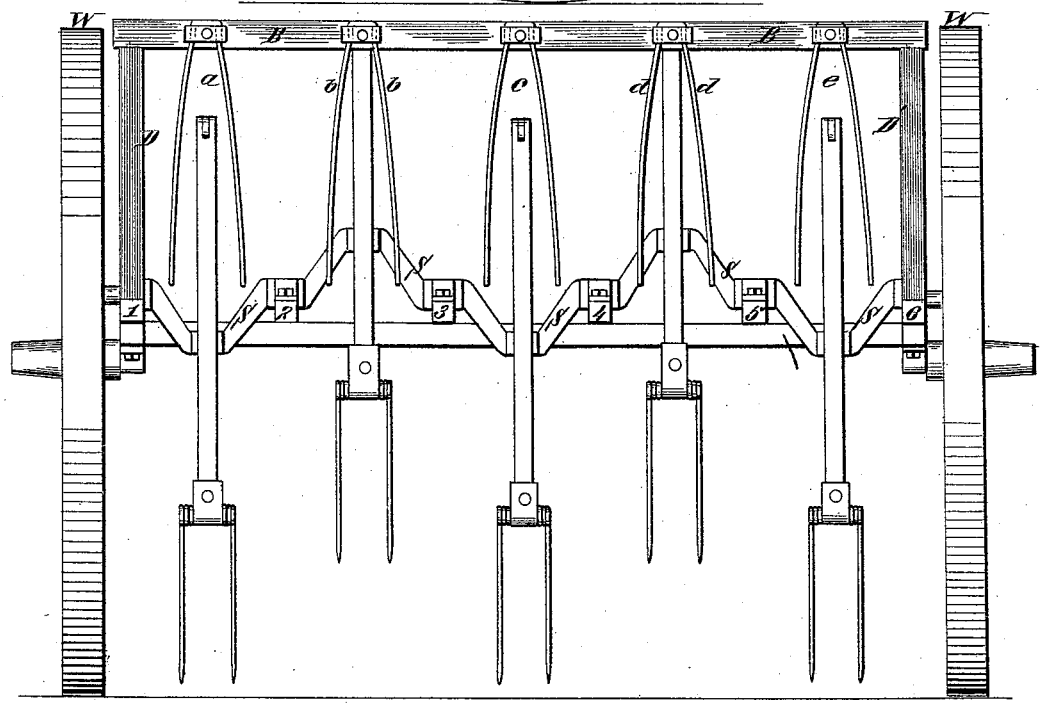

Figure 1 represents a side elevation of a tedder having my invention applied thereto. Fig. 2 is a rear elevation of Fig. 1.

The object of my invention is to protect the machinery of the tedder from the flying hay which often becomes wrapped and knotted about the arms and crank and impedes their motion and occasions frequent delays and breakages and serious inconvenience. If the wind is blowing it is often impossible to operate the tedder, and especially if the tedder is going with the wind. My improvement is designed to overcome and obviate this difficulty, and to render the operation of the tedder practical when the wind is blowing, and whether driven with or against the wind, and to save the breakage of forks, and the consequent expense and loss of time.

My invention and improvement consists of a fender or shield for the above-described arms so attached and placed as to protect them and the contiguous machinery from flying and falling hay. It projects out and over the arms and crank, so as not to interfere with the working of the arms and yet shield them from the hay.

It consists of a light bar of wood or other suitable material B B, extended across the width of the machine inside of the wheels W W', and placed as nearly as convenient over the points of connection between the crank-shafts S S' and the beams 1 2 3 4 5 6, &c., and fastened to and resting on braces or supports D D', which are fastened to any two or more of the beams, and elevated so as to support the bar B B above and avoid all danger of interference with the free action of the rotary arms. To this bar there are fastened by any firm and secure device a number of iron or other metal rods, as $b\ c\ d\ e$, curved to the form of an arc, and extending downward and to the rear from the bar B B, but sufficiently far apart to permit the free action of the arms and avoid any interference with the same. These rods or fenders $a\ b\ c\ d\ e$ are constructed of double length and bent in the center, so as to form an eye through which they may be fastened at proper intervals to the cross-bar B B, and curved downward and rearward in the manner above described, and forming a fender or shield to the arms.

The office of the bar B B is to support the fender-rods, and the purpose of the fenders is to intercept the flying hay and to ward it off from the machinery of the tedder.

Having thus described my invention, what I claim as new, and desire to secure by Letters Patent, is—

In a hay-tedding machine, the combination, with reciprocating arms, of a cross-bar carried upon uprights above the said arms and fenders, each of the said fenders consisting of a single piece secured in its central part to the said cross-bar and having its opposite ends bent downward upon the opposite sides of one of the said reciprocating arms, as described.

GIDEON CREWS.

Attest:
T. W. B. CREWS,
MARSHALL F. MCDONALD.